United States Patent [19]

Keerie et al.

[11] 3,953,819
[45] Apr. 27, 1976

[54] FLOW SENSORS

[75] Inventors: Donald Keerie, Ewhurst; John Anthony Gordon Hammond, Guildford; Peter Michael Hamey, Emsworth, all of England

[73] Assignee: Sperry Rand Limited, London, England

[22] Filed: Oct. 7, 1974

[21] Appl. No.: 512,491

[30] Foreign Application Priority Data
Oct. 10, 1973 United Kingdom............... 47212/73

[52] U.S. Cl.................................. 338/36; 73/228
[51] Int. Cl.² ........................................ H01C 13/00
[58] Field of Search......................... 338/36; 73/228; 340/239 R

[56] References Cited
UNITED STATES PATENTS
2,917,922  12/1959  Morse................................. 73/228
2,966,133  12/1960  Hube .............................. 73/228 X
3,354,716  11/1967  Wiebe et al...................... 73/228 X
3,525,969   8/1970  Newman............................... 338/41
3,545,274  12/1970  Derr et al. ...................... 338/41 X Primary Examiner—C. L. Albritton
Attorney, Agent, or Firm—Barnes, Kisselle, Raisch & Choate

[57] ABSTRACT

A flow sensor for producing an electrical signal dependent upon fluid flow has a housing insertable in a bore extending transversely to and intersecting a flow passage in a port plate. A flap pivoted to the housing about an axis transverse to the flow passage is biassed by spring means into a resting position in which the flow passage is obturated. Pivotal movement of the flap from its resting position by fluid flow in the flow passage is converted into an electrical signal by a transducer, such as a potentiometer whose slider is coupled to the flap.

14 Claims, 8 Drawing Figures

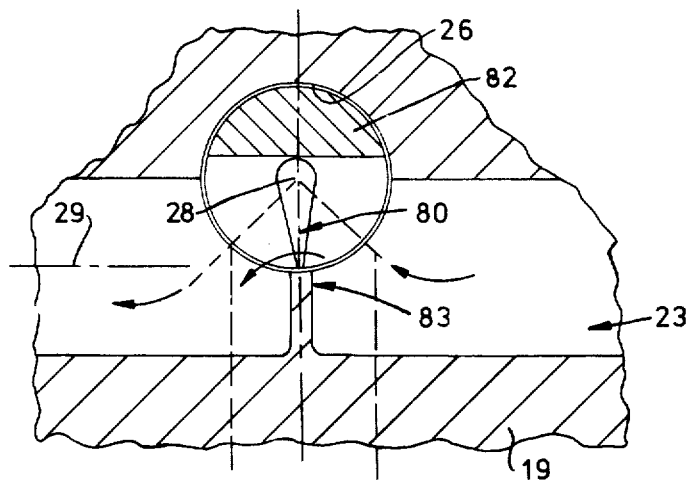
FIG. 5.
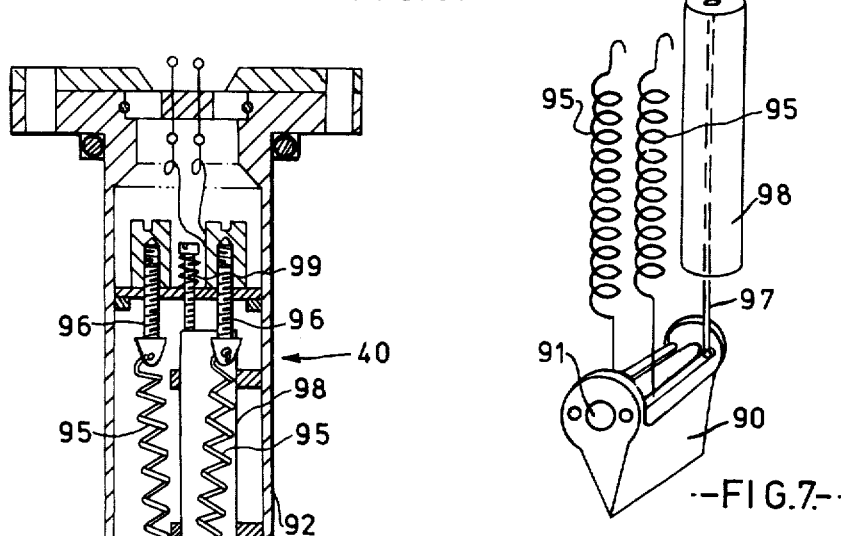
FIG. 6.
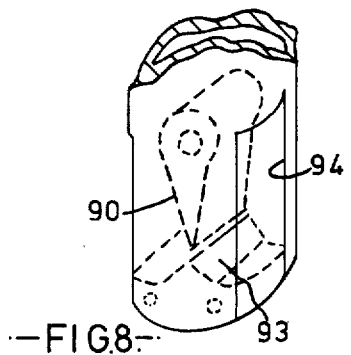
FIG. 7.
FIG. 8.

FLOW SENSORS

The present invention relates to flow sensors for converting a fluid flow into an electrical signal.

In British Patent No. 1,335,041 there is described a flow sensor having a spool displaceable against spring means from a central position in which it obturates a throat. The shape of the throat is such that the pressure drop across the sensor is proportional to fluid flow. This pressure drop could be converted into an electrical signal, but it is more convenient to connect the spool to the slider of a potentiometer such that the voltage on the tapping of the potentiometer is directly proportional to the fluid flow to the sensor. A disadvantage of this sensor is the difficulty in inserting it in a port plate whilst keeping the dimensions of the port plate to a minimum.

According to the present invention, a flow sensor for producing an electrical signal dependent upon the rate of fluid flow through a passage in a block, such as a port block or port plate, comprises a sensor housing fitted in an access opening in said block along an axis extending transversely to said passage, said opening intersecting said passage, a flap pivoted to said housing about an axis transverse to the axis of said passage, spring means biasing said flap to a position in which said flap obturates said passage, said flap being displaced from said obturating position against said spring means by fluid flow through the passage, and mechanical/electrical transducer means for converting the displacement of said flap into an electrical signal.

Conveniently, the mechanical/electrical transducer means comprises a potentiometer whose slider is suitably coupled to the flap.

In one embodiment, the flap is fitted to said housing about an axis co-axial with or parallel to the housing axis. In this embodiment, it is convenient for the potentiometer to be a rotary potentiometer whose slider is directly coupled to a spindle to which the flap is attached.

In another embodiment, the flap is pivoted to the housing about an axis which is transverse to the housing axis as well as transverse to the passage axis. In this case, it is convenient to provide a linear potentiometer whose slider is connected to a crank pin or eccentric pin attached to the flap.

The invention is further described, by way of example, with reference to the accompanying drawings, in which:

FIG. 5 is a sectional view showing the flow sensor of FIGS. 2 to 4 in the flow passage of the port plate of FIG. 1;

FIG. 6 is a longitudinal section of a second embodiment of flow sensor;

FIG. 7 is a detail perspective view of parts of the flow sensor of FIG. 6; and

FIG. 8 is a fragmentary perspective view of one end of the flow sensor of FIGS. 6 and 7.

Figure 1:
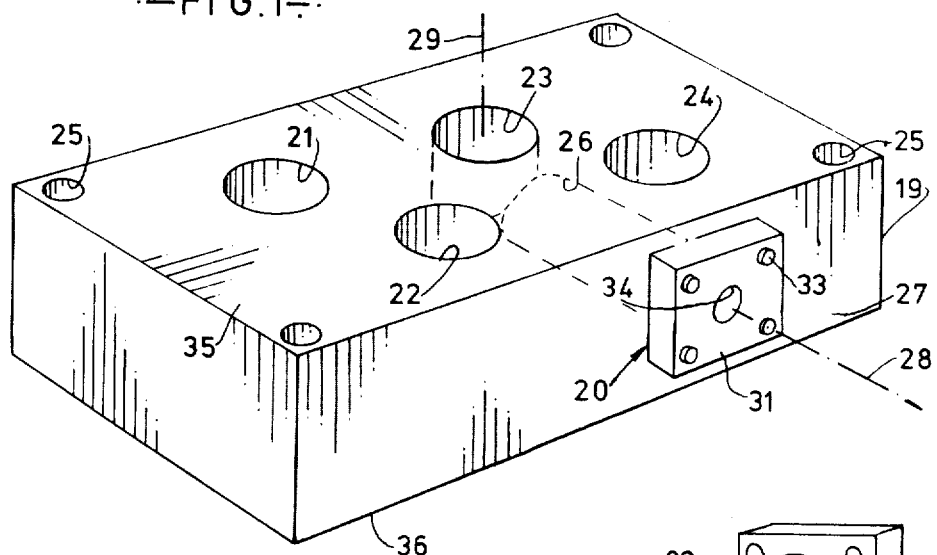
FIG. 1 is a perspective view of a port plate in which a flow sensor in accordance with the invention is fitted.
Figure 2:
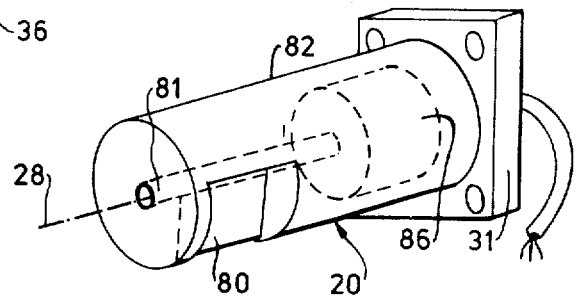
FIG. 2 is a perspective view of one embodiment of flow sensor as fitted to the port plate of FIG. 1.
Figure 3:
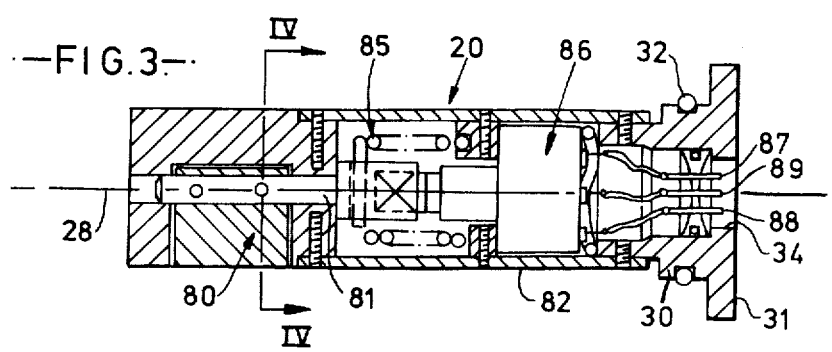
FIG. 3 is a longitudinal section of the flow sensor of FIG. 2.
Figure 4:
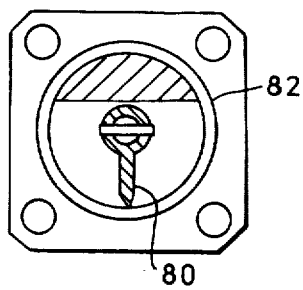
FIG. 4 is a section on the line IV—IV of FIG. 3.

Referring to FIG. 1, there is shown a port plate 19 in the form of a rectangular block. This block has four generally circular through passages or ports 21, 22, 23 and 24 arranged relatively to one another in accordance with the "CETOP" standard. The port plate 19 has additional holes or through bores 25 enabling the port plate to be attached to other blocks, such as valve blocks.

For the purpose of measuring the rate of fluid flow through the passage 23 a flow sensor 20 is provided and is inserted into a bore 26 forming an access opening in the port plate 19 from a side face 27 thereof. The axis 28 of the opening 26 is perpendicular to the axis 29 of the passage 23. The bore 26 intersects the opening 23 but the axes 28 and 29 do not intersect. This is shown more clearly in FIG. 5 of the drawings.

The flow sensor 20 as shown in FIGS. 2 to 5 of the drawings comprises a vane 80 secured to a spindle 81 journalled concentrically in a housing 82 about an axis coincident with the axis 28 of the housing and transverse to the axis 29 of the flow passage 23. The pivotal axis 28 of the vane 80 is offset by approximately the radius of the flow passage 23 from the axis 29 of this passage. The free edge of the vane 80 cooperates with the free edge of a shelf 83 projecting partially into the flow passage 23 opposite the access opening 20. In the mid-position of the vane 80 illustrated in the drawings the flow passage is effectively closed or obturated. The flow of fluid through the passage 23 in one direction or the other displaces the vane 80 clockwise or anti-clockwise against the force of a torsion spring 85. The spindle 81 is coupled to the slider of a rotary potentiometer 86 to displace the slider to the left or right of its mid-position. A constant supply voltage is applied between terminals 87 and 88 and the voltage on the slider appears at a terminal 89 as the flow feedback signal. The torsion spring 85, the potentiometer 86, the vane 80 and the shelf 83 can be designed so that the signal appearing at the terminal 89 is proportional to the rate of fluid flow through the passage 23.

The housing 82 is closed by a cover 30 formed with a flange 31 and provided with a sealing ring 32 to enable the housing to be secured in position inside the bore 26 by means of screws 33 and sealed to this bore. A small opening 34 in the cover 30 provides access to the terminals 87, 88 and 89. It will be seen from FIG. 5 that the shelf 83 is integral with the port plate 19. The passage or port 23 can be formed by drilling from opposite faces 35 and 36 of the port plate towards the centre thereof to leave a thin web and then by drilling the bore 26 from the side face 27 so as to break into the two previous borings at this web whereby to remove a part of the web, so leaving the shelf 83.

A second embodiment of flow sensor 40 is illustrated in FIGS. 6, 7 and 8. In the second embodiment a vane 90 is pivoted for rotation about an axis 91 towards one end of a housing 92. The free edge of the vane 90 cooperates with the free edge of a projection 93 to constrict a flow passage 94. The vane 90 is biased into its null position illustrated, in which the passage 94 is obturated, by a pair of oppositely acting tension springs 95. The ends of the springs 95 remote from the vane 90 are anchored in the housing 92 by adjustable screws 96. The vane 90 actuates a slider 97 of a linear potentiometer 98, the slider 97 being coupled to a crank pin or eccentric pin on the vane 90. A further adjusting screw 99 serves for zeroing the potentiometer which is slidably supported in the housing 92 and held in abutment with the adjusting screw 99 by a small coil spring.

In this embodiment it will be seen that the projection 93 which corresponds to the shelf 83 of FIG. 5 is formed not in the port plate, but in the housing 92. Whilst in this embodiment the axis 91 of the vane 90 is perpendicular to the axis of the housing 92, when the housing is inserted in a suitable bore in the port plate, the axis of which bore in this case intersects the axis 29 of the flow passage 23, the passage 94 in the housing 92 is aligned with the flow passage 23 and the axis 91 of the flap is again perpendicular to the axis 29 of the flow passage 23. The pivotal axis 91 of the vane 90 is offset from the axis of the flow passage 23 by approximately the radius of the flow passage.

It will be seen that in each embodiment the flow sensor housing 20, 40 is in the form of a relatively narrow diameter cartridge which can be slipped into a bore extending from one of the narrow faces of the port plate and intersecting the flow passage through which the flow is to be measured. This enables the flow sensor to be fitted in a port plate of relatively small thickness.

Whilst two embodiments of flow sensor having mechanical/electrical transducers in the form of potentiometers with sliders are illustrated, other forms of transducer are possible. For example, a variable resistance carbon pile may be used to convert the movement of the vane 90 into an electrical signal. Also, inductive transducers for producing a signal dependent upon the position of the vane may be employed.

It is, of course, possible to insert additional components in the port plate 19. For example, pressure transducers (not shown) may be so inserted in the port plate as to communicate with one or more of the passages 21 to 24 for the purpose of measuring fluid pressure in the respective passages.

The flow sensors shown in the drawings are particularly suitable for use in a control device as described in Walters et al. U.S. patent Application Ser. No. 511,739 filed concurrently herewith and having a common assignee with the present patent application, wherein a main valve is attached to the port plate such that two of the passages 21 to 24 serve as supply and return passages and the other two serve as service passages connected to a hydraulic actuator. The arrangement may be such that the passage 23 containing the flow sensor is the supply passage or the return passage or one of the service passages. The output of the flow sensor is compared with a desired flow signal and the resulting error signal is used to control a solenoid operated pilot valve controlling the main valve.

We claim:

1. A flow sensor for producing an electrical signal dependent upon the rate of fluid flow comprising a block having a flow passage therein through which the fluid flows, said block having an access opening whose axis extends transversely to said flow passage, said opening intersecting said passage, and a sensor cartridge fitted in said access opening, said sensor cartridge comprising a housing, a flap pivoted to said housing about an axis transverse to the axis of said flow passage, spring means in said housing biasing said flap to a position in which said flap obturates said flow passage, said flap being progressively displaced from said obturating position against said spring means by fluid flow through the passage as the rate of fluid flow increases, and mechanical/electrical transducer means in said housing for converting the angular displacement of said flap into an electrical signal corresponding to the flow rate.

2. A flow sensor according to claim 1 in which said mechanical/electrical transducer means comprises a potentiometer having a slider coupled to said flap.

3. A flow sensor according to claim 1 in which said flap is fitted to said housing about an axis co-axial with or parallel to the housing axis.

4. A flow sensor according to claim 1 in which said flap is pivoted to said housing about an axis which is transverse to the housing axis as well as transverse to the passage axis.

5. A flow sensor for producing an electrical signal dependent upon the rate of fluid flow comprising a block having a flow passage therein through which the fluid flows, said block having an access opening whose axis extends transversely to said flow passage, said opening intersecting said passage, a sensor housing fitted in said access opening, a flap pivoted to said housing about an axis transverse to the axis of said flow passage, spring means biasing said flap to a position in which said flap obturates said flow passage, said flap being displaced from said obturating position against said spring means by fluid flow through the passage, and mechanical/electrical transducer means for converting the displacement of said flap into an electrical signal, said mechanical/electrical transducer means comprising a rotary potentiometer having a slider directly coupled to the flap.

6. A flow sensor for producing an electrical signal dependent upon the rate of fluid flow comprising a block having a flow passage therein through which the fluid flows, said block having an access opening whose axis extends transversely to said flow passage, said opening intersecting said passage, a shelf in said block partially projecting into said flow passage opposite said access opening, a sensor housing fitted in said access opening, a flap pivoted to said housing about an axis transverse to the axis of said flow passage, said flap cooperating with said shelf, spring means biasing said flap to a position in which said flap obturates said flow passage, said flap being displaced from said obturating position against said spring means by fluid flow through the passage, and mechanical/electrical transducer means for converting the displacement of said flap into an electrical signal.

7. A flow sensor for producing an electrical signal dependent upon the rate of fluid flow comprising a block having a flow passage therein through which the fluid flows, said block having an access opening whose axis extends transversely to said flow passage, said opening intersecting said passage, a sensor housing fitted in said access opening, a flap pivoted to said housing about an axis transverse to the housing axis and transverse to the axis of said flow passage, spring means biasing said flap to a position in which said flap obturates said flow passage, said flap being displaced from said obturating position against said spring means by fluid flow through the passage, and mechanical/electrical transducer means for converting the displacement of said flap into an electrical signal, said mechanical/electrical transducer means comprising a linear potentiometer having a slider connected eccentrically to said flap.

8. A flow sensor for producing an electrical signal dependent upon the rate of fluid flow comprising a block having a flow passage therein through which the fluid flows, said block having an access opening whose axis extends transversely to said flow passage, said opening intersecting said passage, a sensor housing fitted in said access opening, a flap pivoted to said housing about an axis transverse to the axis of said flow passage, spring means biasing said flap to a position in which said flap obturates said flow passage, said flap being progressively displaced from said obturating position against said spring means by fluid flow through the passage, and mechanical/electrical transducer means for converting the displacement of said flap into an electrical signal, said flap being pivoted to said housing about an axis which is transverse to the housing axis as well as transverse to the passage axis, said housing having a passage aligned with said flow passage and having a projection projecting into said housing passage, said flap cooperating with said projection.

9. A flow sensor according to claim 1 in which said block has a shelf formed therein partially projecting into said flow passage to define a free edge, said flap having a free edge cooperating with said free edge of said shelf.

10. A flow sensor according to claim 5 in which said block has a shelf formed therein partially projecting into said flow passage to define a free edge, said flap having a free edge cooperating with said free edge of said shelf.

11. A flow sensor for producing an electrical signal dependent upon the rate of fluid flow comprising a block having a generally circular flow passage therein through which the fluid flows, said block having an access opening whose axis extends transversely to said flow passage, said opening intersecting said passage, means projecting into said passage opposite said access opening to define a free edge transverse to the axis of the flow passage, a sensor housing fitted in said access opening, a flap pivoted to said housing about an axis parallel to said free edge of said projecting means, said flap having a free edge cooperating with said free edge of said projecting means, spring means biasing said flap to a position in which said flap obturates said flow passage, said flap being displaced from said obturating position against said spring means by fluid flow through the passage and mechanical/electrical transducer means for converting the displacement of said flap into an electrical signal.

12. A flow sensor according to claim 11 in which the pivotal axis of said flap is offset from the axis of said flow passage by approximately the radius of the flow passage.

13. A flow sensor according to claim 6 in which said mechanical/electrical transducer means comprises a potentiometer having a slider coupled to said flap.

14. A flow sensor according to claim 11 in which said mechanical/electrical transducer means comprises a potentiometer having a slider coupled to said flap.

* * * * *